Figure 1:
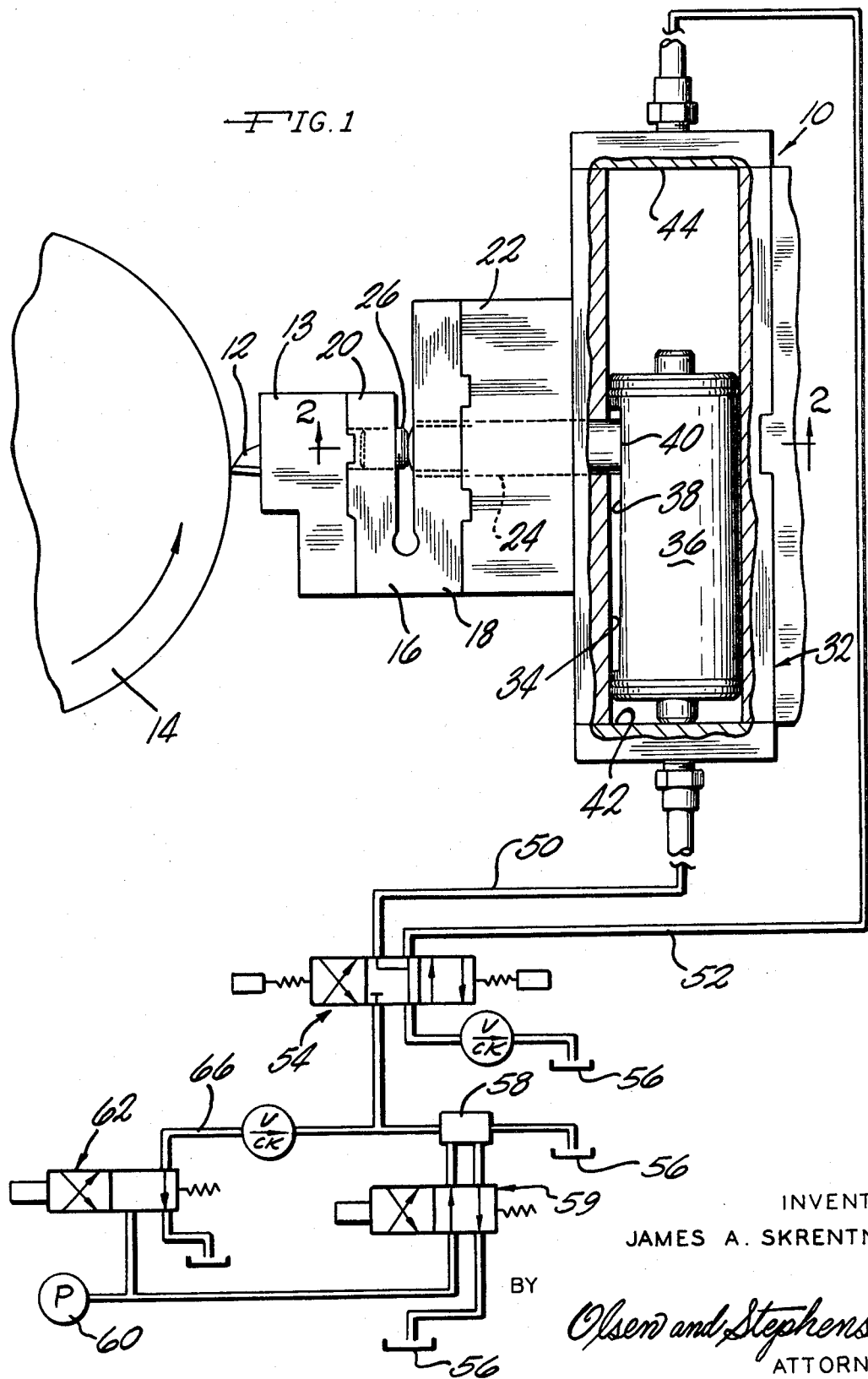

United States Patent
Skrentner

[15] 3,677,115
[45] July 18, 1972

[54] HYDRAULICALLY OPERATED TOOL COMPENSATOR UNIT

[72] Inventor: James A. Skrentner, Sterling Heights, Mich.

[73] Assignee: La Salle Machine Tool, Inc., Warren, Mich.

[22] Filed: March 16, 1970

[21] Appl. No.: 19,898

[52] U.S. Cl. ............................................................. 82/24
[51] Int. Cl. ........................................................ B23b 21/00
[58] Field of Search ............................................ 82/24, 24 A

[56] References Cited

UNITED STATES PATENTS

| | | | |
|---|---|---|---|
| 3,449,986 | 6/1969 | Joichi | 82/24 X |
| 3,136,190 | 6/1964 | Musy | 82/24 |
| 3,338,121 | 8/1967 | Tolliver | 82/24 A |
| 3,010,344 | 11/1961 | Christensen | 82/24 A |

Primary Examiner—Leonidas Vlachos
Attorney—Olsen and Stephenson

[57] ABSTRACT

Hydraulically operated apparatus for periodically moving a machine tool to compensate for conditions such as tool wear and automatically maintain a pre-established position of the tool within predetermined tolerance limits. In response to a signal indicating the necessity for resetting the cutting tool to move it either toward or away from the work, a metering device admits a predetermined volume of fluid to a piston and cylinder assembly to provide for adjusted movement of the tool through a predetermined incremental distance.

3 Claims, 2 Drawing Figures

HYDRAULICALLY OPERATED TOOL COMPENSATOR UNIT

This invention relates generally to apparatus for resetting machine tools and more particularly to improved apparatus of this type that is capable of two-way operation and is fluid actuated.

Continual wear of a machine tool, such as a boring or turning tool, must be taken into account where a machine is set to continuously machine like parts to predetermined dimensions. Also, variable thermal conditions in the area of the tool and the workpiece make it necessary to adjust the position of the tool relative to the workpiece as these conditions change. In the past, the general practice has been to manually measure workpieces which have been subjected to the operation of the machine tool. When a workpiece was over or under size more than the allowed tolerance, the machine was shut down and the position of the tool was manually adjusted to bring subsequently machined parts within the allowable tolerances. One or more trial cuts were made with the tool and additional tool adjustments and trial cuts were made where necessary. This is a time consuming process that is less than satisfactory. Mechanical apparatus has also been considered for automatically resetting the tool, but in some instances fluid actuated compensator apparatus is preferred.

In the improved tool resetting apparatus of this invention, hydraulically operated apparatus is provided for accurately moving the tool a predetermined increment of travel each time tool adjustment is required. The cutting tool is mounted on a support which is partially split so that it has a fixed section and a movable section which can be deflected relative to the fixed section. The tool is mounted on the deflectable section so that when this section is deflected, the tool will be moved very small distances in a direction either toward or away from the work to adjust the tool position to compensate for changed conditions. The apparatus includes a fixed body and a plunger mounted on the body and extended through the fixed section of the support into engagement with the deflectable section. The plunger is mounted for axial sliding movement to deflect the deflectable support section in the direction of the work. A hydraulically operable piston and cylinder assembly is included in the body and the piston is mounted so that it can slide in a direction transversely of the direction of movement of the plunger. An inclined surface on the piston engages the plunger so that in response to piston movement, the plunger is moved in a direction to deflect the tool support. A pump and conduit assembly supplies fluid to the cylinder for moving the piston and a metering device is interposed in the conduit and connected to conventional gauging apparatus capable of signaling the metering device when a workpiece approaching maximum or minimum tolerance limits is detected. In response to such a signal, the metering device allows a predetermined volume of fluid to enter the cylinder so as to move the piston a distance necessary to obtain a predetermined increment of travel of the plunger. The maximum stroke of the piston limits the distance the plunger can be moved, and as a result the split support cannot be overdeflected. Accordingly, the present invention provides a simple fluid actuated device for moving a machine tool small incremental distances so as to compensate for changing conditions such as those caused by heat and tool wear.

Figure 2:
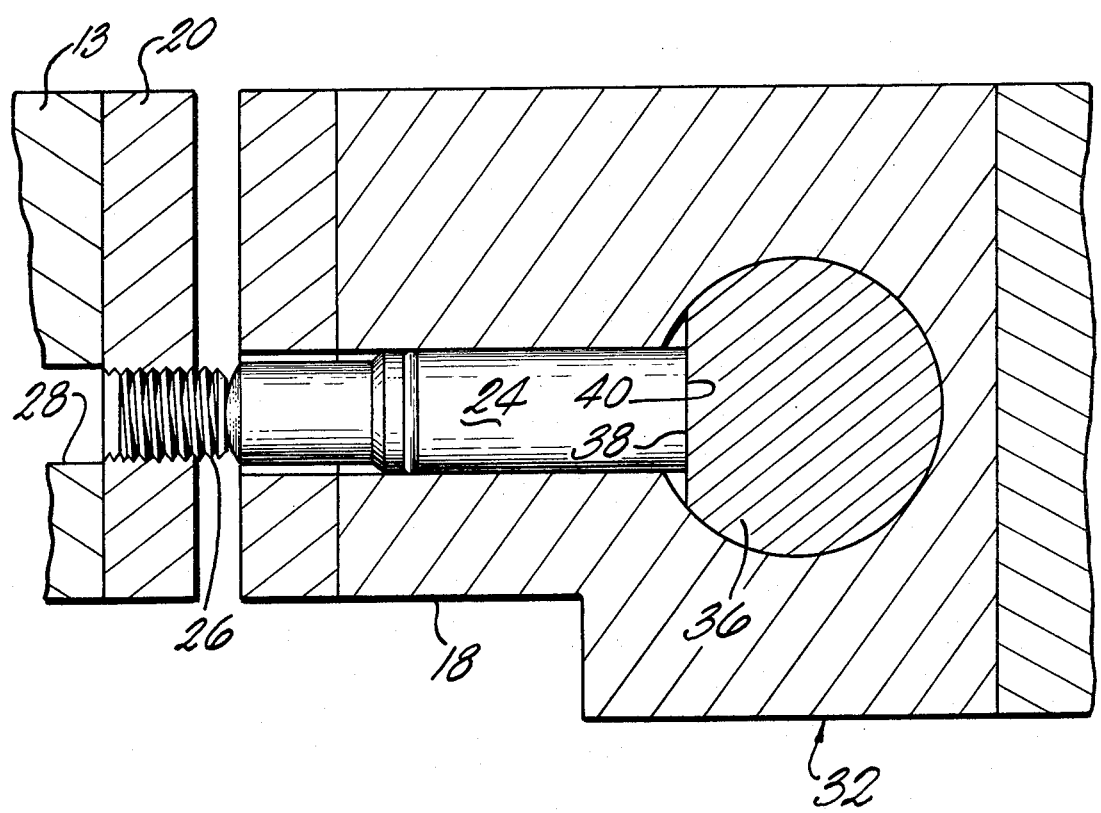

Further objects, features and advantages of this invention will become apparent from a consideration of the following description, the appended claims, and the accompanying drawing in which:

FIG. 1 is a combination elevational and diagrammatic view of the apparatus of this invention shown in assembly relation with a cutting tool and a fragmentary portion of a workpiece, with some parts broken away and other parts shown in section for the purpose of clarity; and FIG. 2 is an enlarged transverse sectional view of the apparatus of this invention as seen from the line 2—2 in FIG. 1.

With reference to the drawing, the apparatus of this invention, indicated generally at 10, is illustrated in FIG. 1 in assembly relation with a cutting tool 12 positioned for turning a workpiece 14 and mounted on a tool block 13 which is in turn mounted on a support 16. As shown in FIG. 1, the support 16 is partially split so that it has a fixed section 18 and a deflectable section 20 on which the tool block 13 is mounted. The apparatus of this invention includes a body 22 on which the fixed support section 18 is mounted. A plunger 24 is slidably supported in the body 22 so that it extends through the fixed support section 18 and abuts a screw 26 mounted in the deflectable section 20. The screw 26 is called a "pre-load screw" because it is adjustable to pre-load the plunger 24. Access to the screw 26, to enable advancement or retraction of the screw toward or away from the plunger 24, can be achieved in a variety of ways, such as by making an access hole 28 in the tool block 13, as shown in FIG. 2.

A piston and cylinder assembly 32, which is an integral part of the body 22, includes a bore 34 that extends transversely of the longitudinal axis of the plunger 24. The assembly 32 also includes a piston 36 which is provided on one side with a longitudinally inclined surface 38 positioned in sliding engagement with the inner end 40 of the plunger 24. Thus, when the piston 36 is positioned adjacent the end 42 of the bore 34, the plunger 24 is in a retracted position, namely, a position allowing for maximum movement of the tool 12 toward the work 14. As the piston 36 is moved toward the opposite end 44 of the bore 34, the inclined surface 38 progressively moves the plunger 24 toward the work 14 so as to advance the tool 12 in the same direction.

As shown in FIG. 1, an inlet conduit 50 is connected to the body 22 for admitting fluid to the bore 34 at the end 42 thereof. An outlet conduit 52 is connected to the body 22 at the opposite end of the bore 34. The conduits 50 and 52 are connected to a conventional solenoid operated four-way valve 54 which connects to tank 56 and to a metering device 58 which is in turn connected to a conventional solenoid operated spring center two-way valve 59 which is in turn connected to a pump 60. The metering device 58 is of a conventional construction and is connected to a conventional gauging device (not shown) which is also connected to the valve 54. The gauging device operates automatically to measure workpieces 14 which have been machined by the tool 12.

When a workpiece 14 is approaching maximum or minimum allowable tolerance limits, the gauging device signals the metering device 58 and the valve 54 to allow a predetermined volume of fluid from the pump 60 to flow through the metering device 58 to the valve 54. The signal from the gauging device has moved the valve 54 to a position in which it directs this predetermined volume of fluid to either the conduit 50 or the conduit 52 depending on the nature of the signal. This fluid in turn moves the piston 36 a predetermined distance in the bore 34. This movement of the piston 36 results in a predetermined adjusted movement of the plunger 24 to advance or retract the tool 12 a predetermined distance relative to the work 14. It can thus be seen that the tool 12 can be moved through predetermined increments of travel to continuously compensate for tool wear and the like until the piston 36 has been moved to the end 44 of the bore 34. At such time, it is necessary to manually replace or reset the tool 12.

A valve 62 is normally in a closed position closing a by-pass line 66 which connects the pump 60 and valve 54 without going through the metering device 58. When the tool 12 is manually replaced or reset, valve 62 is electrically energized so as to move it to a position in which fluid an flow continuously from pump 60 to valve 54. The valve 54 is then moved to a position in which line 52 is supplied with fluid from pump 60 and line 50 communicates with tank 56 so that fluid will flow into the bore 34 at the end 44 thereof to reset the piston 36 to the position shown in FIG. 1. The valve 62 is then returned to its normal closed position shown in FIG. 1. This allows for another cycle of operation like that described above in which the piston 36 will be moved in response to signals from the gauging device to automatically position the tool 12 so as to maintain parts 14 within allowed tolerance limits.

In the event conditions at the tool 12 and the workpiece 14 require movement of the tool away from the workpiece 14 at some time during a cycle of operation, the workpiece gauging device will signal the valve 54 that workpieces 14 are approaching the minimum tolerance. This signal will result in movement of the valve 54 to a position in which the metering device 58 communicates with the line 52 and the line 50 communicates with tank 56. The gauging device will also signal the metering device 58 to admit a predetermined volume of fluid through the line 52 to the bore 34 so as to move the piston 36 in a direction toward the end 42 of the bore 34. This will result in movement of the tool 12 away from the workpiece 14, so as to compensate for the condition which caused workpieces 14 to be machined close to the minimum tolerance size, this movement of the tool 12 being due to the split tool support 16 and the pre-load screw 26 which insures a continual pressure of the tool support 16 on the plunger 24.

From the above description it is seen that this invention provides improved two-way fluid actuated apparatus for continuously and automatically resetting the tool 12. The apparatus 10 is simple in construction and reliable in operation over a prolonged service life by virtue of the fact that it consists primarily of the cooperative arrangement of the piston inclined surface 38 and the tool 12.

What is claimed is:

1. In a machine tool resetting apparatus for automatically moving a machine tool back and forth in a pre-established direction, a body, plunger means having an axis and being mounted on said body for movement along said axis in said direction, means forming a bore in said body extending transversely of said plunger means, piston means slidably mounted in said bore, a surface on said piston means inclined in said pre-established direction, said surface being engaged with said plunger means and operable on movement of said piston means in one direction to move said plunger means in said direction along said axis, and means for introducing fluid under pressure into said bore so as to move said piston means back and forth in said bore comprising pump means, conduit means connecting said pump means and said bore and a metering device interposed in said conduit means and operable to admit fluid to said bore only in predetermined volumetric increments for achieving movement of said piston means in predetermined increments of distance.

2. Resetting apparatus according to claim 1 further including multi-position valve means in said conduit means between said metering device and said bore, said valve means being movable to positions for admitting fluid to said bore for moving said piston in opposite directions.

3. Resetting apparatus according to claim 2 wherein said metering device and valve means are adapted to respond in operation to workpiece gauging means.

* * * * *